United States Patent Office 2,859,329  
Patented Nov. 4, 1958

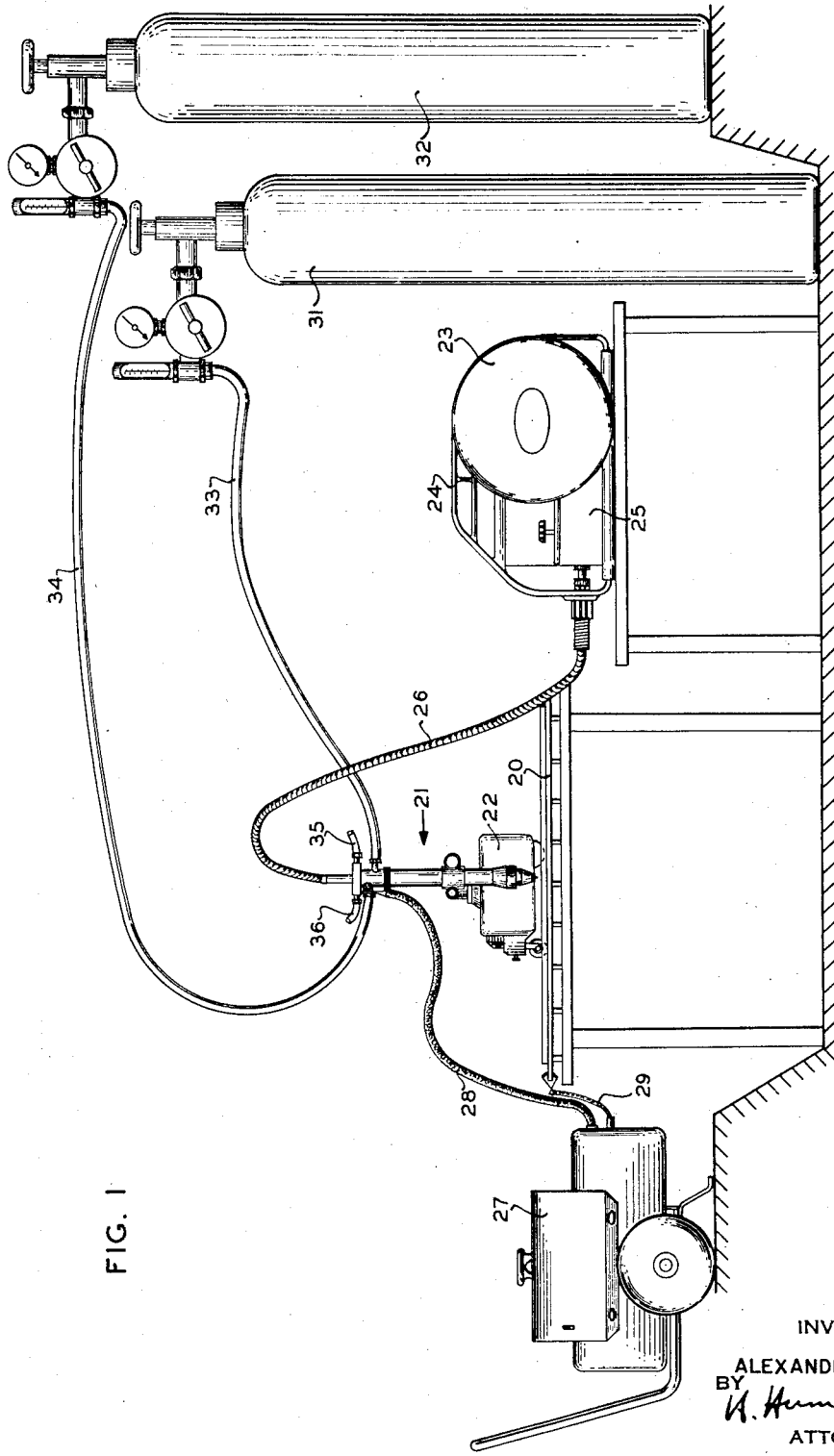

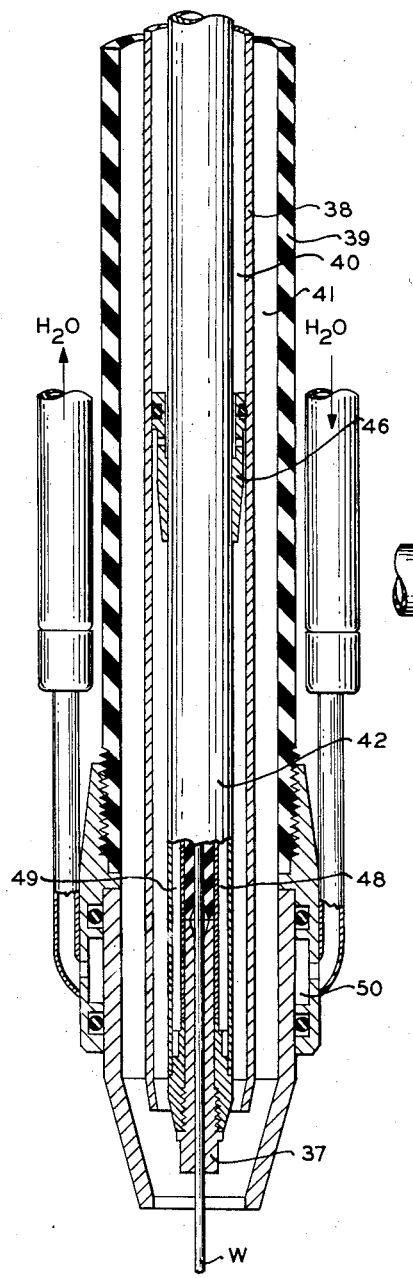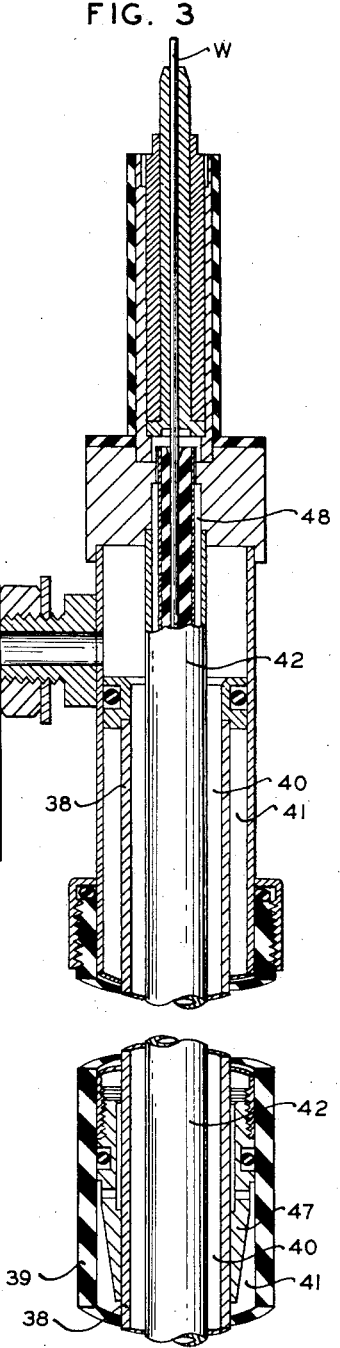

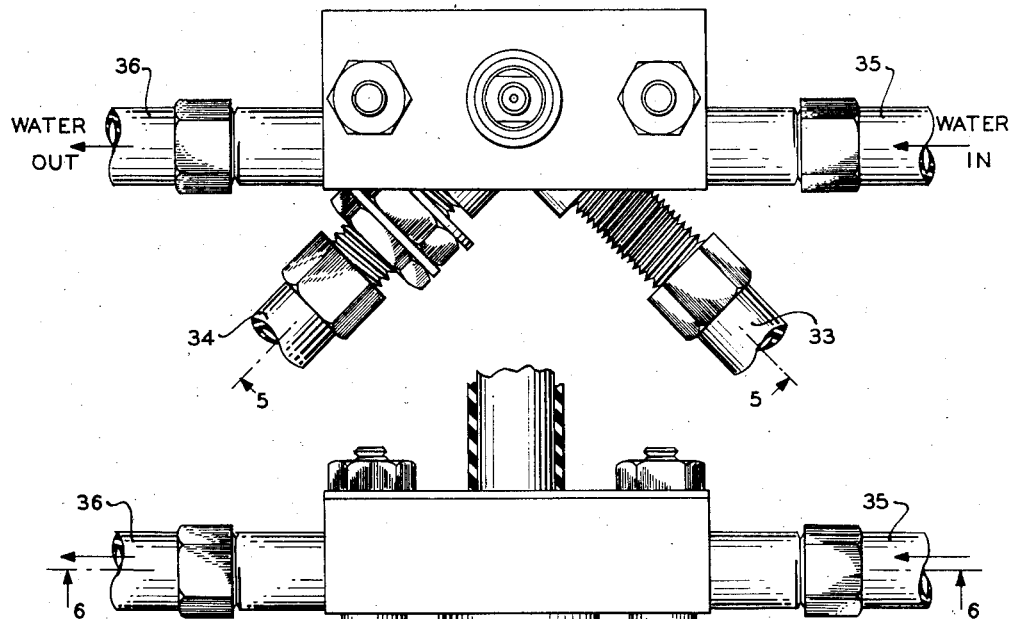
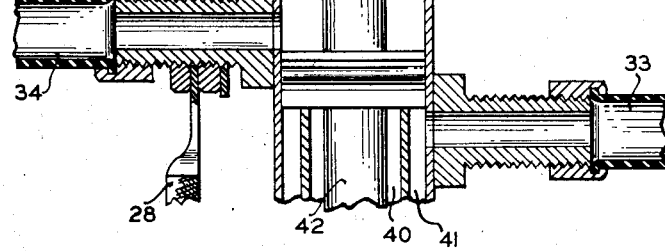
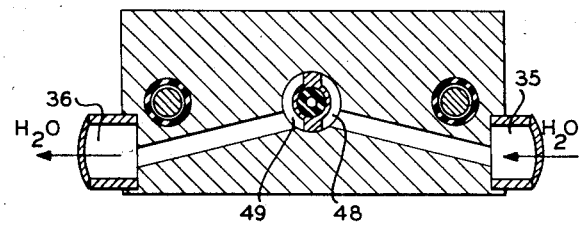
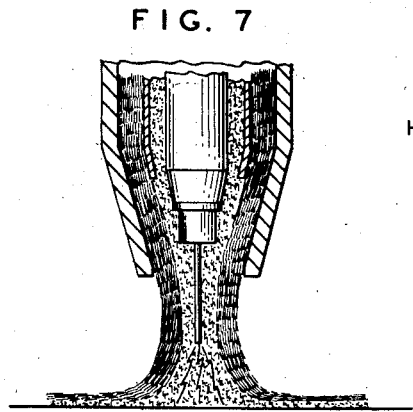

2,859,329

GAS SHIELDED ARC WELDING

Alexander Lesnewich, New Providence, N. J., assignor to Air Reduction Company, Incorporated, New York, N. Y., a corporation of New York Application April 29, 1954, Serial No. 426,388

17 Claims. (Cl. 219—74)

This invention relates to gas shielded arc welding. More specifically it relates to gas shielded arc welding with multiple shielding gas streams.

Inert gas shielded arc welding with both consuming and non-consuming electrodes is an important and useful welding method and for many welding applications it has become substantially indispensable. Because of its assets the process is enjoying wide popularity despite the fact it employs relatively expensive inert gas as the shielding medium.

An object of this invention is to provide improvements in methods and apparatus utilizing multiple shielding gas streams for effecting a saving in the cost of shielding gas for gas shielded electric arc welding.

Another object is to provide improvements in methods and apparatus for obtaining the arc characteristics of one shielding atmosphere with the shield forming characteristics of another shielding atmosphere.

A further object is to provide a novel method for forming an improved multiple gas stream encompassing a welding arc, wherein an outer annular shielding gas stream isolates an inner arc sustaining gas from the ambient atmosphere, and to provide a novel type of nozzle construction for the projection of a plurality of laminar flow inert gas streams about a welding arc.

Another object is to provide improved methods and apparatus for gas shielded metal arc welding of metals, particularly of ferrous metals, with a welding arc having the characteristics of the argon and/or helium shielded arc but with a gas shield composed predominantly of carbon dioxide.

Another object is to provide improved methods and apparatus for gas shielded metal arc welding of metals, particularly copper base metals, with a welding arc having the characteristics of the argon and/or helium shielded arc but with a gas shield composed predominantly of nitrogen.

These and other objects and advantages of the invention will be pointed out or will become apparent from the following description and the accompanying drawings. In general this invention contemplates improvements in arc welding with a plurality of shielding gas streams cooperating to form a novel composite shield having advantageous properties and low cost.

Fig. 1 illustrates generally suitable apparatus for the present invention.

Fig. 2 illustrates, partially in section and to a larger scale, the lower portion of the welding head shown in Fig. 1.

Fig. 3 illustrates, partially in section and to a larger scale, the upper portion of the welding head shown in Fig. 1.

Fig. 4 is a plan view of the welding head of Fig. 1 drawn to the same scale as the sectional views of Figs. 2 and 3.

Fig. 5 is a partial elevational view of the upper portion of the welding head. The partial section shown in Fig. 5 is taken along line 5—5 of Fig. 4.

Fig. 6 is a section of the welding head taken along line 6—6 of Fig. 5.

Fig. 7 illustrates, schematically the gas flow patterns contemplated by the present invention.

In inert gas shielded metal arc welding of the type disclosed in Muller et al. Patent No. 2,504,868, a continuous bare electrode is fed down through an inert gas shield to a welding arc to effect a weld. It has been found that this process depends, in part, for its success on the formation and maintenance of an adequate gas shield. The inert gas must be fed to the region of the arc as a non-turbulent flow stream. The presence of turbulence entrains air which adversely affects the electrical characteristics of the arc and the metal transfer characteristics across the arc and causes the formation of oxides and intrides as well as porosity, in the weld metal. The shielding gas streams, therefore, must be substantially non-turbulent and of sufficient thickness and stiffness to retain its flow characteristics for an appreciable time (distance) as it is projected from the gas nozzle. It has been found that concentric annular streams of shielding gas can be so projected from a properly formed nozzle at appropriate pressures and velocities, as to retain their individual identities for a sufficient time to enable them to act separately, and at the same time cooperatively, to provide new and useful results in gas shielded arc welding.

According to the present invention, a small diameter stream of a monatomic inert gas such as argon and/or helium is projected at a low rate of flow from an inner nozzle to form an arc environment or arc atmosphere through which a welding arc is maintained between an electrode and a workpiece. Such inner arc sustaining gas stream deliberately is made of such small diameter and low rate of flow as to be incapable in itself of perfectly or completely shielding the arc and weld metal, thus, only a minimum amount of such inert gas is used. This thin inner shield would not per se be adequate to produce good welding results because it lacks sufficient stiffness and thickness. If it were propected into the open air, its non-turbulent flow characteristics would deteriorate prematurely causing entrainment of air and resulting damage to the weld. However, a second or outer shielding gas stream, of a cheaper gas such as carbon dioxide is projected around the said thin inner shield so as to protect it from the open or ambient air. The outer stream confines the central or inner gas stream and causes it to retain its non-turbulent flow characteristics for a sufficiently long time (projected distance) to enable this small diameter inner gas stream to effectively provide the required shielding atmosphere for the arc. The rate of flow of the inner stream, is made sufficiently large relative to the rate of flow of the outer stream that when this inner stream strikes a flat plate held at right angles to the axis of the stream the gas spreads out in all directions (as may be observed by smoke tracer tests in the absence of the arc) to form a smoothly flowing film of inert gas over the weld and the surrounding surfaces of the plate. When the flow rates of the two streams are properly regulated the outer retaining shield spreads out above the film of gas produced by the inner gas stream and under ideal conditions, the outer gas is separated from the surface of the plate by a film of the inner gas stream, as schematically depicted in Figure 7. Further, and as also will be apparent from inspection of Figure 7, the outer nozzle from which the outer shielding gas stream is projected completely surrounds and extends beyond the discharge opening of the inner nozzle. The inner and outer gas streams consequently are merged into a single, laminated, flowing column having an inner core encompassed by an outer annulus, prior to their discharge into the open air.

Thus welding according to the Muller et al. process can be performed with a much lower flow of monatomic inert shielding gas, if an outer auxiliary stream of gas is projected around a central shielding stream to confine it and prevent its flow characteristics from deteriorating. This surrounding gas stream can be composed of a relatively inexpensive gas, and thus, the net cost of welding by the Muller et al. process can be substantially reduced. As a practical matter it occasionally is difficult to prevent any mixing of the two gas streams. It is always possible however, to substantially completely prevent mixing of the gas streams in the region of the arc prior to impingement of the streams on the work surface. Further, if the two gases are properly selected in relation to each other and to the metal being welded some mixing may be tolerated and can even in some instances, be beneficial. For example, carbon dioxide has been found to be an an excellent gas for projection as an annular shielding stream around an inner arc sustaining core of argon, particularly for the welding of ferrous metals with the inert gas shielded consumable electrode process. Similarly, nitrogen is considered as suitable for retaining or isolating an inner core of argon, particularly for the welding of copper.

Referring to Fig. 1 a workpiece to be welded is designated 20. A welding head 21 is illustrated as supported in operable relation to the workpiece by any conventional means. Relative motion is provided between the workpiece and the welding head by the motorized carirage 22. The welding apparatus illustrated, is in general, of the type disclosed and claimed in Muller et al. Patent 2,504,-868. It comprises a reel containing a continuous length of electrode wire and means for withdrawing this wire and feeding it through the welding head to the weld zone where an electric arc is maintained from the electrode wire to the work. The wire reel 23 is mounted on a carriage frame 24 which houses a wire feed motor and associated wire feeding apparatus designated generally as 25. Wire is withdrawn from the reel 23 by the wire feeding mechanism 25 and pushed through a flexible casing 26 to the welding head 21. Welding current is supplied from a welding machine 27 through the welding cable 28 to the welding head 21. A ground lead 29 connected from the workpiece 20 to the welding machine 27 completes the welding circuit. Shielding gas is provided from compressed gas cylinders 31 and 32 through the usual pressure and flow control apparatus to the welding head 21 by tubes 33 and 34. The welding head 21 may be cooled by circulating water supplied to the head by tube 35 and discharging through tube 36.

Figs. 2, 3, 4, 5, and 6 illustrate the construction of the welding head in greater detail. Basically the welding head comprises a welding current contact tube 37 which is electrically connected through the internal metal parts of the welding head to the welding cable 28. The electrode wire W, fed to the welding head through casing 26, passes down through the welding head which includes the contact tube 37. Welding current is transferred to the electrode wire from the contact tube 37. The welding arc is maintained from the end of wire W to the workpiece 20.

The welding head includes concentric barrels 38 and 39 which form concentric annular gas passages 40 and 41 surrounding the welding head wire guide and contact tube assembly 42. Shielding gas is supplied from cylinder 31 through hose 33 into annular passage 41. Shielding gas is supplied from cylinder 32 through hose 34 into annular passage 40. Annular passages 40 and 41 provide relatively long unobstructed approach passages to their respective discharge orifices. Diffusers 46 and 47 in the respective passages assist in the formation of a non-turbulent gas flow through the passages and aid in maintaining the concentricity of the assembly. The cooling water is circulated through the length of the wire guide assembly by cooling water passages 48, 49. The outer gas nozzle is separately water cooled by circulating water in annular passage 50.

It has been found advantageous, according to the present invention, to taper inwardly the nozzle forming extremities of both the inner and outer barrels as clearly indicated in the drawing. This gradual and controlled reduction in cross sectional area through which the gas stream must pass seems to increase the velocity without adversely affecting the non-turbulent flow characteristics and thereby makes possible the projection of the stream with non-turbulent characteristics a considerable distance even though the volumetric flow is relatively small. Also because of the practical necessity of getting so many parts in concentric relation to one another in a duplex nozzle device, the use of straight untapered nozzles would mean having the outer nozzle particularly, of relatively large diameter. By terminating the inner barrel upstream from the outer barrel, a further necking-down or a wire-drawing effect is produced in the inner gas stream further increasing its stiffness despite the relatively low flow and without disturbing the laminar flow characteristics of either stream.

By terminating the inner barrel upstream from the outer barrel the pressure equalization between the two gas streams and the atmosphere is accomplished in two stages which further lessens the possibilities of introducing turbulence into the streams.

An example of good design practice in a welding head of this type for electrode wires up to $\frac{1}{8}$ inch diameter is as follows:

Outside diameter of water cooled wire guide and contact tube assembly 42—$\frac{1}{2}$ inch.

Inside diameter of inner barrel 38—$\frac{3}{4}$ inch.

Outside diameter of inner barrel 38—$\frac{7}{8}$ inch.

Inside diameter of outer barrel 39—$1\frac{1}{4}$ inches.

Angle of taper of terminal portion or nozzle of outer barrel 39—30° total included angle (15° angle with axis of barrel)

Length of tapered portion of barrel 39 (measured along axis)—1 inch.

Outer barrel discharge orifice diameter—$\frac{3}{4}$ inch.

Angle of taper of terminal portion or nozzle of inner barrel 38—30° total included angle (15° angle with axis or barrel)

Length of tapered portion of barrel 38 (measured along axis)—$\frac{1}{4}$ inch.

Inner barrel discharge orifice diameter—$\frac{19}{32}$ inch.

Axial distance from discharge face of outer barrel to discharge face of inner barrel—$\frac{5}{8}$ inch.

Axial distance from discharge face of outer barrel to end of wire guide and contact tube assembly—$\frac{1}{4}$ inch.

This invention has been found particularly useful and economical in the welding of carbon and low alloy steels. It has been found for example, that good welds can be made using a welding head as described above with argon as the central gas stream delivered at a flow rate of only 12 cubic feet per hour. For the welding of carbon steels, low allow steels, and nickel, $CO_2$ has been found highly satisfactory as the outer gas stream. It is heavy and a relatively low flow of the order of 40 cubic feet per hour adequately retains the inner shield and prevents the deterioration of its flow characteristics. It is advantageous to use a heavy or dense gas to form the outer shield because such gases provide good shield forming characteristics. $CO_2$ is only slightly reactive with steel and contact of the $CO_2$ with the molten weld metal is not detrimental. Since $CO_2$ is believed to break down to CO and O in the electric arc, slight mixing of the $CO_2$ with the argon has the effect of adding small quantities of $O_2$ to the argon. This has been found beneficial in steel welding. With apparatus as described, welding with argon and $CO_2$ on steel produces the beneficial results that derive from the Muller et al. process but the cost of shielding gas has been greatly reduced. With conventional welding heads flow rates of 50 cubic feet per hour of argon might be required for a given welding job. At a rate of 10¢ per cubic foot shielding gas per hour of welding (assuming a continuous duty cycle) amounts to $5.00. With the present invention the same results can be obtained using 12 cubic feet of argon at 10¢ per cubic foot and 40 cubic feet per hour of CO at ½¢ per cubic foot. Using the duplex shield, the total gas cost per hour is only $1.40.

I has been found that good results can be obtained with a welding head of the type described above under the following gas flow conditions:

| Flow of $CO_2$ through outer annulus, C. F. H. | Flow of A through inner annulus, C. F. H. |
| --- | --- |
| 20 | 7 |
| 30 | 6 to 17 |
| 40 | 8 to 20 |
| 60 | 12 to 30 |

In each of the above cited examples the optimum argon flow was about ⅓ of the $CO_2$ flow. For the apparatus described above it was also found that good results were obtained (argon arc electrical characteristics and argon arc metal transfer characteristics with adequate shielding of the weld puddel) if the ratio of the velocity of the gas flow in the outer annulus to the velocity of the gas flow in the inner annulus is between .75 and 2.00. It was also observed that good results were accompanied by a ratio of the Reynolds number for the flow of $CO_2$ in the outer annulus to the Reynolds number for the flow of A in the inner annulus of less than 6. The inner gas shield flow rate must be sufficient to prevent the inward radial flow of gas from the outer shield stream toward the arc as a result of impingement of the streams on the work.

As may be expected the exact nozzle configuration described above is not the only operable design. It was found, for instance, in fillet welding that it was advantageous to modify the outer barrel nozzle geometry somewhat. In one instance it was made longer and tapered down to a ½ inch orifice with good results. In another instance this nozzle was made oval in cross section at the orifice.

While the application of this invention to the welding of carbon steels and low alloys steels using $CO_2$ and argon as the shielding gases has been found most advantageous, the same principle and reasoning can be applied to the welding of other materials, or to the welding of the same material with other gases. For instance, steel can readily be welded with helium as the inner shield and $CO_2$ as the outer shield. Also, of course, mixtures of helium and argon or mixtures of an inert gas with minor percentages of active gases can be employed as the inner shield. Nickel can also be welded with an inert gas inner shield and a $CO_2$ outer shield. For the welding of copper and high copper alloys, an inert gas may be used as the inner shield and nitrogen, which is relatively inert with respect to copper, may be used as the outer shield.

While this invention has been described with respect to inert gas shielded consuming electrode arc welding, the principles are equally applicable to inert gas shielded non-consuming electrode arc welding.

Although only certain specific embodiments of the invention have been shown and described herein in connection with gas shielded arc welding with multiple shielding gas streams, it is to be understood that the invention is not limited to the particular forms disclosed, but may be used in other ways without departure from its spirit as defined by the following claims.

I claim:

1. A method of gas shielded arc welding which comprises establishing and maintaining an electric welding arc between an electrode and a workpiece, surrounding said arc with an inner shielding gas stream comprising essentially inert monatomic gas and incapable in itself of adequately shielding the terminal portion of said electrode, said arc, and the molten weld metal produced by said arc, and confining said arc surrounding stream with an outer shielding gas stream comprising essentially carbon dioxide projected from a converging nozzle concentrically surrounding said inner shielding gas stream at a point downstream of the discharge orifice of the nozzle projecting said inner shielding gas stream.

2. A method of gas shielded electric arc welding comprising establishing an electric welding arc between an electrode and a workpiece, enveloping said arc with a flowing stream of gas comprising essentially monatomic inert gas, and incapable in itself of adequately shielding the terminal portion of said electrode, said arc, and the molten weld metal produced thereby, and supplementing said arc enveloping stream with a surrounding annular stream of gas comprising essentially carbon dioxide which acts to confine said arc enveloping stream and produce therewith an adequate shield for said electrode, said arc, and the molten weld metal produced thereby.

3. A welding method according to claim 2 in which said monatomic inert gas is argon.

4. A welding method according to claim 2 in which said monatomic inert gas is helium.

5. A method of gas shielded arc welding which comprises maintaining an arc from an electrode to a workpiece, projecting a flowing stream of inert monatomic gas having non-turbulent characteristics from a converging nozzle surrounding said electrode, said stream being accelerated by said convergence while still retaining its non-turbulent flow characteristics but being incapable in itself of adequately shielding the terminal portion of said electrode, said arc, and the molten weld metal produced by said arc, and surrounding said stream of inert monatomic gas with a flowing stream of carbon dioxide projected with non-turbulent flow characteristics from a converging nozzle concentrically surrounding said inert monatomic gas stream at a point downstream of the discharge orifice of said inert gas nozzle, said carbon dioxide stream acting to confine said inert gas stream to produce therewith an effective shield for the terminal portion of said electrode, said arc, and the molten weld metal produced by said arc.

6. In inert gas shielded metal arc welding with an electrode selected from the group consisting of carbon steel, low alloy steel, and nickel, the improvement which comprises providing the shielding gas as a free flowing laminated stream having an inner core of argon and a surrounding stream of carbon dioxide, projecting both the inner and outer portions of said laminated stream with substantially non-turbulent flow characteristics, and providing sufficient volumetric flow in said argon stream to prevent radial flow inwardly toward the arc of carbon dioxide as a result of impingement of the laminated stream on the work.

7. In inert gas shielded arc welding the improvement which comprises providing the shielding gas as a free flowing laminated stream having an inner core of inert monatomic gas and a surrounding stream of carbon dioxide, projecting both the inner and outer portions of said laminated stream with substantially non-turbulent flow characteristics from nozzles having controlled converging sections, and maintaining the ratio of the velocity of the gas flow in the outer portion of said laminated stream to the velocity of the gas flow in the inner portion of said laminated stream between .75 and 2.0.

8. In inert gas shielded arc welding the improvement which comprises providing the shielding gas as a free flowing laminated stream having an inner core of argon and a surrounding stream of carbon dioxide, projecting both the inner and outer portions of said laminated stream with substantially non-turbulent flow characteristics from nozzles having controlled converging sections, and maintaining the ratio of the Reynolds number for the flow of carbon dioxide in the nozzle projecting the outer stream to the Reynolds number for the flow of argon in the nozzle projecting the inner stream at a value less than 6.

9. A method of gas shielded arc welding which comprises establishing and maintaining an electric welding arc between an electrode selected from the group comprising carbon steels, low alloy steels, and nickel, and a workpiece selected from the same group, surrounding said arc with a shielding gas stream comprising essentially argon projected as a non-turbulent flow stream, and confining said argon stream with a non-turbulent flow stream of carbon dioxide, the ratio of carbon dioxide to argon volumetric flow rates being about 3.

10. Gas shielded arc welding apparatus comprising electrode positioning means, means for introducing welding current to said electrode, a first gas shielding nozzle surrounding said electrode, means for supplying inert monatomic gas to said nozzle to be delivered from said nozzle as a non-turbulent flow stream incapable in itself of adequately shielding the arc welding operation, a second nozzle, having a controlled convergent section downstream of said first nozzle and concentrically surrounding the gas stream delivered by said first nozzle, means for supplying a gas other than said inert monatomic gas to said second nozzle to be delivered from said second nozzle as a non-turbulent flow stream to cooperate with the inert gas stream from said first nozzle to effectively shield said arc welding operation.

11. Apparatus according to claim 10 in which said first nozzle has a controlled convergent section.

12. Apparatus according to claim 10 in which the second nozzle converging section is frusto-concial and has an included angle of about 30°.

13. Apparatus according to claim 10 in which the second nozzle converging section is frusto-conical and has an included angle of about 30° and in which said first nozzle has a frusto-conical convergent section with an included angle of about 30°.

14. The method of gas shielding an electric welding arc comprising projecting from a nozzle toward a workpiece into the open air an annular stream of carbon dioxide having a wall thickness sufficient to exclude substantially all the ambient air from the inner space surrounded by said annular shielding stream and between said nozzle and said workpiece, separately feeding argon to the space within said annular shielding stream at a rate of flow sufficient to fill the said annular space and prevent ingress thereto of any substantial quantity of said carbon dioxide from the said annular shielding gas stream, and maintaining a welding arc between said workpiece and an electrode having its arc end positioned substantially concentrically within said annular shielding gas stream and substantially wholly within the boundaries of said argon.

15. In a method of welding metals wherein an electric arc is maintained within a welding zone between an electrode and a weld puddle on a metal workpiece, the steps comprising screening off the atmosphere from said welding zone by enclosing said welding zone within a stream of carbon dioxide, and shielding said electrode, electric arc and weld puddle from said stream of carbon dioxide by surrounding them with a stream of a monatomic gas.

16. The method of claim 15 in which said metal workpiece is composed of a carbon-containing ferrous metal.

17. The method of claim 15 in which said monatomic gas is selected from the group consisting of helium and argon.

References Cited in the file of this patent
UNITED STATES PATENTS

| | | |
|---|---|---|
| 903,826 | Arsem | Nov. 17, 1908 |
| 2,504,867 | Muller | Apr. 18, 1950 |
| 2,522,482 | Olzak | Sept. 12, 1950 |

UNITED STATES PATENT OFFICE
CERTIFICATE OF CORRECTION

Patent No. 2,859,329                                    November 4, 1958

Alexander Lesnewich

It is hereby certified that error appears in the printed specification of the above numbered patent requiring correction and that the said Letters Patent should read as corrected below.

Column 2, line 16, for "intrides" read -- nitrides --; line 39, for "propected" read -- projected --; column 3, line 17, before "excellent" strike out "an"; column 4, line 58, for "allow" read -- alloy --; column 5, line 9, for "I" read -- It --; line 27, for "puddel" read -- puddle --; column 7, line 35, for "frusto-concial" read -- frusto-conical --.

Signed and sealed this 10th day of February 1959.

(SEAL)
Attest:

KARL H. AXLINE
Attesting Officer

ROBERT C. WATSON
Commissioner of Patents